United States Patent
Esswie et al.

(10) Patent No.: US 11,606,122 B2
(45) Date of Patent: Mar. 14, 2023

(54) INTERFERENCE PRE-CANCELLATION FOR MULTI-USER ULTRA LOW LATENCY COMMUNICATIONS IN WIRELESS NETWORKS

(71) Applicant: Nokia Technologies Oy, Espoo (FI)

(72) Inventors: Ali Esswie, Aalborg (DK); Klaus Pedersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 77 days.

(21) Appl. No.: 17/047,227

(22) PCT Filed: Apr. 16, 2018

(86) PCT No.: PCT/EP2018/059680
§ 371 (c)(1),
(2) Date: Oct. 13, 2020

(87) PCT Pub. No.: WO2019/201421
PCT Pub. Date: Oct. 24, 2019

(65) Prior Publication Data
US 2021/0167823 A1    Jun. 3, 2021

(51) Int. Cl.
*H04B 7/0452* (2017.01)
*H04B 7/0456* (2017.01)
(Continued)

(52) U.S. Cl.
CPC ......... *H04B 7/0452* (2013.01); *H04B 7/0456* (2013.01); *H04L 5/0048* (2013.01); *H04W 72/042* (2013.01)

(58) Field of Classification Search
None
See application file for complete search history.

(56) References Cited

U.S. PATENT DOCUMENTS

| | | |
|---|---|---|
| 2015/0358064 A1 | 12/2015 | Benjebbour et al. |
| 2017/0359807 A1 | 12/2017 | Hong et al. |

(Continued)

FOREIGN PATENT DOCUMENTS

| | | |
|---|---|---|
| WO | 2017/056003 A2 | 4/2017 |
| WO | 2018/142020 A1 | 8/2018 |

OTHER PUBLICATIONS

Pocovi et al., "Signal Quality Outage Analysis for Ultra-Reliable Communications in Cellular Networks", IEEE Globecom Workshops (GC Wkshps), Dec. 6-10, 2015, 6 pages.
(Continued)

*Primary Examiner* — Diane L Lo
(74) *Attorney, Agent, or Firm* — Brake Hughes Bellermann LLP

(57) ABSTRACT

A technique may include determining, by the ultra low latency user device, a decoder matrix; receiving, by the ultra low latency user device, control information indicating that a scheduled transmission of an ultra low latency data block to the ultra low latency user device is co-scheduled with a transmission of a mobile broadband data block to a mobile broadband user device via a set of shared physical resource blocks using multi-user multiple-input, multiple-output (MU-MIMO); and projecting, by the ultra low latency user device, the decoder matrix of the ultra low latency user device to be substantially orthogonal with a reference spatial subspace in which a precoder matrix for the mobile broadband user device is aligned with the reference spatial subspace, to reduce interference at the ultra low latency user device caused by the transmission of the enhanced mobile broadband data block, when receiving the ultra low latency data block.

13 Claims, 8 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2018/0092104 A1 | 3/2018 | Sheng et al. | |
| 2019/0261380 A1* | 8/2019 | Iyer | H04L 5/1469 |
| 2020/0052864 A1* | 2/2020 | Hosseinian | H04L 5/0094 |
| 2020/0106557 A1* | 4/2020 | Wong | H04B 7/0413 |
| 2020/0186313 A1* | 6/2020 | Wong | H04L 5/0044 |

OTHER PUBLICATIONS

Pocovi et al., "On the Impact of Precoding Errors on Ultra-Reliable Communications", International Workshop on Multiple Access Communications, 2016, pp. 1-10.

Pocovi et al., "Ultra-reliable communications in failure-prone realistic networks", International Symposium on Wireless Communication Systems (ISWCS), Sep. 20-23, 2016, pp. 414-418.

Nielsen et al., "Ultra-Reliable Low Latency Communication (URLLC) using Interface Diversity", IEEE Transactions on Communications, vol. 66, No. 3, Mar. 2018, pp. 1322-1334.

Kotaba et al., "Uplink Transmissions in URLLC Systems with Shared Diversity Resources", IEEE Wireless Communications Letters, vol. 7, No. 4, Aug. 2018, pp. 590-593.

Pedersen et al., "Punctured Scheduling for Critical Low Latency Data on a Shared Channel with Mobile Broadband", IEEE 86th Vehicular Technology Conference (VTC-Fall), Sep. 24-27, 2017, 6 pages.

International Search Report and Written Opinion received for corresponding Patent Cooperation Treaty Application No. PCT/EP2018/059680, dated Jan. 7, 2019, 18 pages.

* cited by examiner

INTERFERENCE PRE-CANCELLATION FOR MULTI-USER ULTRA LOW LATENCY COMMUNICATIONS IN WIRELESS NETWORKS

RELATED APPLICATION

This application claims priority to PCT Application No. PCT/EP2018/059680, filed on Apr. 16, 2018, of which is incorporated herein by reference in its entirety.

TECHNICAL FIELD

This description relates to wireless communications, and in particular, to an automatic retransmission of damaged data in a wireless network

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

According to an example implementation, a method is provided of co-scheduling transmission of both a mobile broadband data block and an ultra low latency data block using multi-user multiple-input, multiple-output (MU-MIMO), the method comprising: determining, by a base station, a reference spatial subspace that indicates a direction; selecting, by the base station, a first user device, out of a plurality of mobile broadband user devices, to receive the mobile broadband data block, based on a Euclidean distance from a precoder matrix for the first user device to the reference spatial subspace; projecting, by the base station, the precoder matrix for the first user device to a target plane that is aligned with the reference spatial subspace; co-scheduling transmission of both a mobile broadband data block to the first user device and an ultra low latency data block to a second user device via a set of one or more physical resource blocks using multi-user multiple-input, multiple-output (MU-MIMO); and transmitting, by the base station to the second user device, control information indicating that the scheduled transmission of the ultra low latency data block to the second user device is co-scheduled with a transmission of the mobile broadband data block via a set of shared physical resource blocks.

According to an example implementation, an apparatus includes at least one processor and at least one memory including computer instructions, when executed by the at least one processor, cause the apparatus to perform co-scheduling transmission of both a mobile broadband data block and an ultra low latency data block using multi-user multiple-input, multiple-output (MU-MIMO), including causing the apparatus to: determine, by a base station, a reference spatial subspace that indicates a direction; select, by the base station, a first user device, out of a plurality of mobile broadband user devices, to receive the mobile broadband data block, based on a Euclidean distance from a precoder matrix for the first user device to the reference spatial subspace; project, by the base station, the precoder matrix for the first user device to a target plane that is aligned with the reference spatial subspace; co-schedule transmission of both a mobile broadband data block to the first user device and an ultra low latency data block to a second user device via a set of one or more physical resource blocks using multi-user multiple-input, multiple-output (MU-MIMO); and transmit, by the base station to the second user device, control information indicating that the scheduled transmission of the ultra low latency data block to the second user device is co-scheduled with a transmission of the mobile broadband data block via a set of shared physical resource blocks.

According to an example implementation, a computer program product includes a computer-readable storage medium and storing executable code that, when executed by at least one data processing apparatus, is configured to cause the at least one data processing apparatus to perform a method of co-scheduling transmission of both a mobile broadband data block and an ultra low latency data block using multi-user multiple-input, multiple-output (MU-MIMO), including: determining, by a base station, a reference spatial subspace that indicates a direction; selecting, by the base station, a first user device, out of a plurality of mobile broadband user devices, to receive the mobile broadband data block, based on a Euclidean distance from a precoder matrix for the first user device to the reference spatial subspace; projecting, by the base station, the precoder matrix for the first user device to a target plane that is aligned with the reference spatial subspace; co-scheduling transmission of both a mobile broadband data block to the first user device and an ultra low latency data block to a second user device via a set of one or more physical resource blocks using multi-user multiple-input, multiple-output (MU-MIMO); and transmitting, by the base station to the second user device, control information indicating that the scheduled transmission of the ultra low latency data block to the second user device is co-scheduled with a transmission of the mobile broadband data block via a set of shared physical resource blocks.

According to an example implementation, a method may include determining, by a ultra low latency user device, a reference spatial subspace; determining, by the ultra low latency user device, a decoder matrix; receiving, by the ultra low latency user device, control information indicating that a scheduled transmission of an ultra low latency data block to the ultra low latency user device is co-scheduled with a transmission of a mobile broadband data block to a mobile broadband user device via a set of shared physical resource blocks using multi-user multiple-input, multiple-output (MU-MIMO); and projecting, by the ultra low latency user device, the decoder matrix of the ultra low latency user device to be substantially orthogonal with the reference spatial subspace in which a precoder matrix for the mobile broadband user device is aligned with the reference spatial subspace, to reduce interference at the ultra low latency user device caused by the transmission of the enhanced mobile broadband data block, when receiving the ultra low latency data block.

According to an example implementation, an apparatus includes at least one processor and at least one memory including computer instructions, when executed by the at least one processor, cause the apparatus to: determine, by a ultra low latency user device, a reference spatial subspace; determine, by the ultra low latency user device, a decoder matrix; receive, by the ultra low latency user device, control information indicating that a scheduled transmission of an ultra low latency data block to the ultra low latency user device is co-scheduled with a transmission of a mobile broadband data block to a mobile broadband user device via a set of shared physical resource blocks using multi-user multiple-input, multiple-output (MU-MIMO); and project, by the ultra low latency user device, the decoder matrix of the ultra low latency user device to be substantially orthogonal with the reference spatial subspace in which a precoder matrix for the mobile broadband user device is aligned with the reference spatial subspace, to reduce interference at the ultra low latency user device caused by the transmission of the enhanced mobile broadband data block, when receiving the ultra low latency data block.

According to an example implementation, a computer program product includes a computer-readable storage medium and storing executable code that, when executed by at least one data processing apparatus, is configured to cause the at least one data processing apparatus to perform a method including: determining, by a ultra low latency user device, a reference spatial subspace; determining, by the ultra low latency user device, a decoder matrix; receiving, by the ultra low latency user device, control information indicating that a scheduled transmission of an ultra low latency data block to the ultra low latency user device is co-scheduled with a transmission of a mobile broadband data block to a mobile broadband user device via a set of shared physical resource blocks using multi-user multiple-input, multiple-output (MU-MIMO); and projecting, by the ultra low latency user device, the decoder matrix of the ultra low latency user device to be substantially orthogonal with the reference spatial subspace in which a precoder matrix for the mobile broadband user device is aligned with the reference spatial subspace, to reduce interference at the ultra low latency user device caused by the transmission of the enhanced mobile broadband data block, when receiving the ultra low latency data block.

The details of one or more examples of implementations are set forth in the accompanying drawings and the description below. Other features will be apparent from the description and drawings, and from the claims.

DETAILED DESCRIPTION

Figure 1:
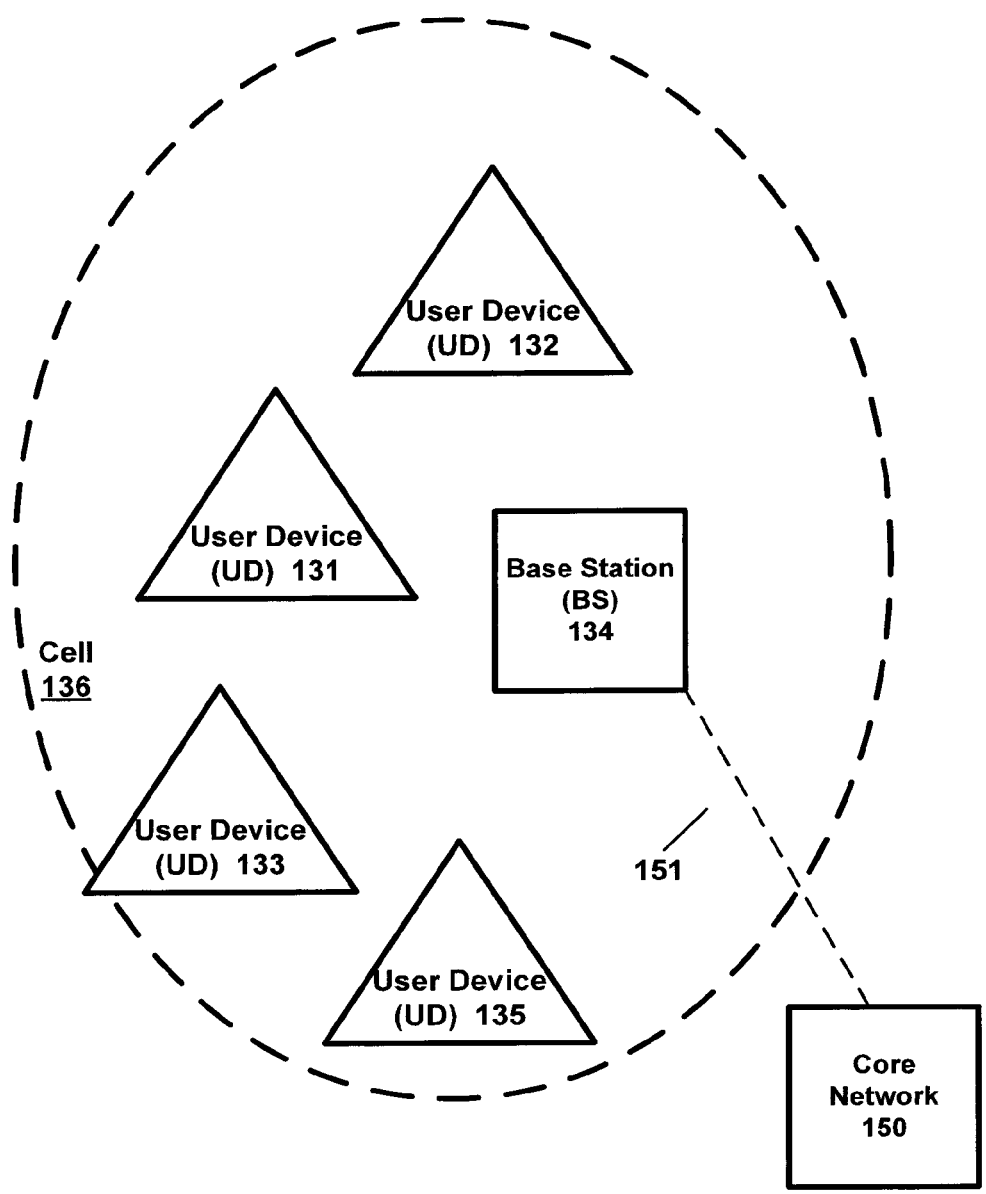
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate.

Figure 2:
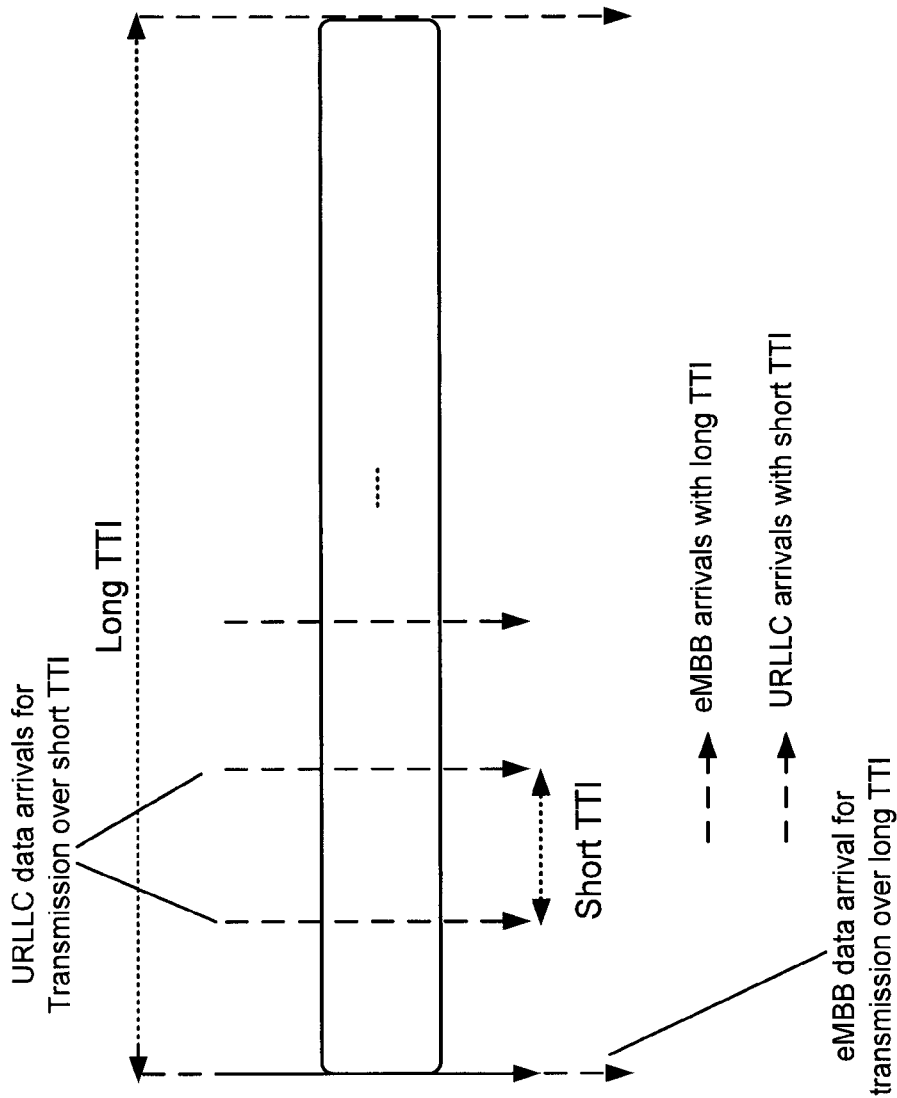
FIG. 2 is a diagram illustrating an example system model of a standardized mixed traffic scenario between the enhanced mobile broadband (eMBB) traffic and URLLC traffic.

FIG. 2 is a diagram illustrating an example system model of a standardized mixed traffic scenario between the enhanced mobile broadband (eMBB) traffic and URLLC traffic. As shown in FIG. 2, eMBB data may be transmitted via a long transmission time interval (TTI), e.g., in order to increase data throughput and/or increase spectral efficiency of the network for eMBB traffic. On the other hand, with a much shorter latency requirement, URLLC data may be transmitted via a short TTI, e.g., to allow URLLC transmission, HARQ (hybrid ARQ) feedback and/or retransmission(s) to provide a much shorter latency. According to an example implementation, the 5G NR may employ different settings for the URLLC and eMBB traffic, respectively, e.g., eMBB traffic with a long transmission time interval (TTI) (e.g., 14 OFDM (orthogonal frequency division multiplexing) symbols or 1 ms) to maximize the overall spectral efficiency, and URLLC traffic with a short TTI (e.g., 2 OFDM symbols or 0.143 ms) to satisfy its stringent (or very short) latency budget. Note that these example TTI sizes are for the case where the PHY (physical entity) numerology is 15 kHz sub-carrier spacing (SCS), but the various example implementations may be applied to or valid for a variety of PHY numerologies or SCS or TTI sizes, such as for also for e.g., 30 kHz and/or 60 kHz SCS configurations.

As noted, URLL traffic (URLLC data transmissions) may require very strict (very short) latency, as compared to other types of traffic, such as eMBB. Thus, according to an example embodiment, one goal may be to minimize the total one-way latency of the URLLC traffic from its arrival (arrival at the transmitting node) to successful decoding (decoding at the receiving node). The URLLC total one-way delay (for a successful transmission/reception) may, for example, be expressed as:

$$\Psi = \Lambda_q + \Lambda_{bsp} + \Lambda_{fa} + \Lambda_{tx} + \Lambda_{uep}$$

where the delay components in order from left to right are: the queuing delay, BS processing delay (at transmitting node), frame alignment delay, transmission delay, and user equipment (UE) processing delays (receiving node processing delays), assuming that the BS is the transmitting node, and the UE is a receiving node of the URLLC traffic. Due to the different numerologies of the 5G NR, the frame alignment delay is bounded by $[0, TTI_{short}]$ instead of $[0, TTI_{long}]$. The processing delay components are further minimized than in conventional LTE-A, where the 5G BSs and UEs are equipped with improved processing capabilities. Hence, the major impacting delay factors of the total URLLC latency are the queuing delay and transmission delays.

The URLLC queuing and transmission delays, in at least some cases, may be difficult to control. The former depends on the URLLC arrival rate, which is sporadic in nature, and cell loading conditions, while the latter may depend on the received signal-to-interference-noise-ratio (SINR) point of the URLLC user, required to be sufficiently enough for the URLLC user to experience as little number of retransmissions as possible, to satisfy its total latency budget.

According to one example, based on the arrival of URLLC traffic for transmission, an ongoing eMBB transmission may be interrupted, and the URLLC traffic/data may be transmitted via the resources (e.g., PRBs) that may have been previously allocated for the eMBB transmission. While this may accomplish relatively low latency for the URLLC traffic, this may significantly impact the performance of the delivery of the eMBB traffic e.g., prioritizing URLLC traffic at the expense of scheduled eMBB traffic may negatively impact eMBB performance, e.g., such as causing an unacceptable latency or transmission delay for the eMBB traffic.

Therefore, according to an example embodiment, a technique is provided in which a BS scheduler co-schedules transmission of both a eMBB data block (transmitted to a first UE) and a URLLC data block (transmitted to a second UE) using via a set of (shared or common) PRBS using MU-MIMO. Co-scheduling, for example, may refer to scheduling of data for (or directed to) two or more users/UEs via the same PRBs (same time-frequency resources) for transmission, e.g., using MU-MIMO. Thus, for example, initially a eMBB transmission may be scheduled or provided via single user MIMO (SU-MIMO) to a first UE (a eMBB UE). In an illustrative example, when URLLC traffic arrives at the BS, the BS may then co-schedule (for transmission via a same or common set of PRBs or time-frequency resources) transmission of both the eMBB data block and a URLLC data block using MU-MIMO (e.g., to allow transmission of both the eMBB data block to a eMBB UE and transmission of a URLLC data block to a URLLC UE via the same set of time-frequency resources).

Also, in an example embodiment, operations may be performed by the BS and/or the URLLC BS to reduce the interference at the URLLC UE based on the transmission of the eMBB data block, when the URLLC UE is receiving the URLLC data block (e.g., operations performed at the BS and/or URLLC UE to decrease the interference at the URLLC UE caused by the co-scheduled eMBB data block transmission).

Figure 3:
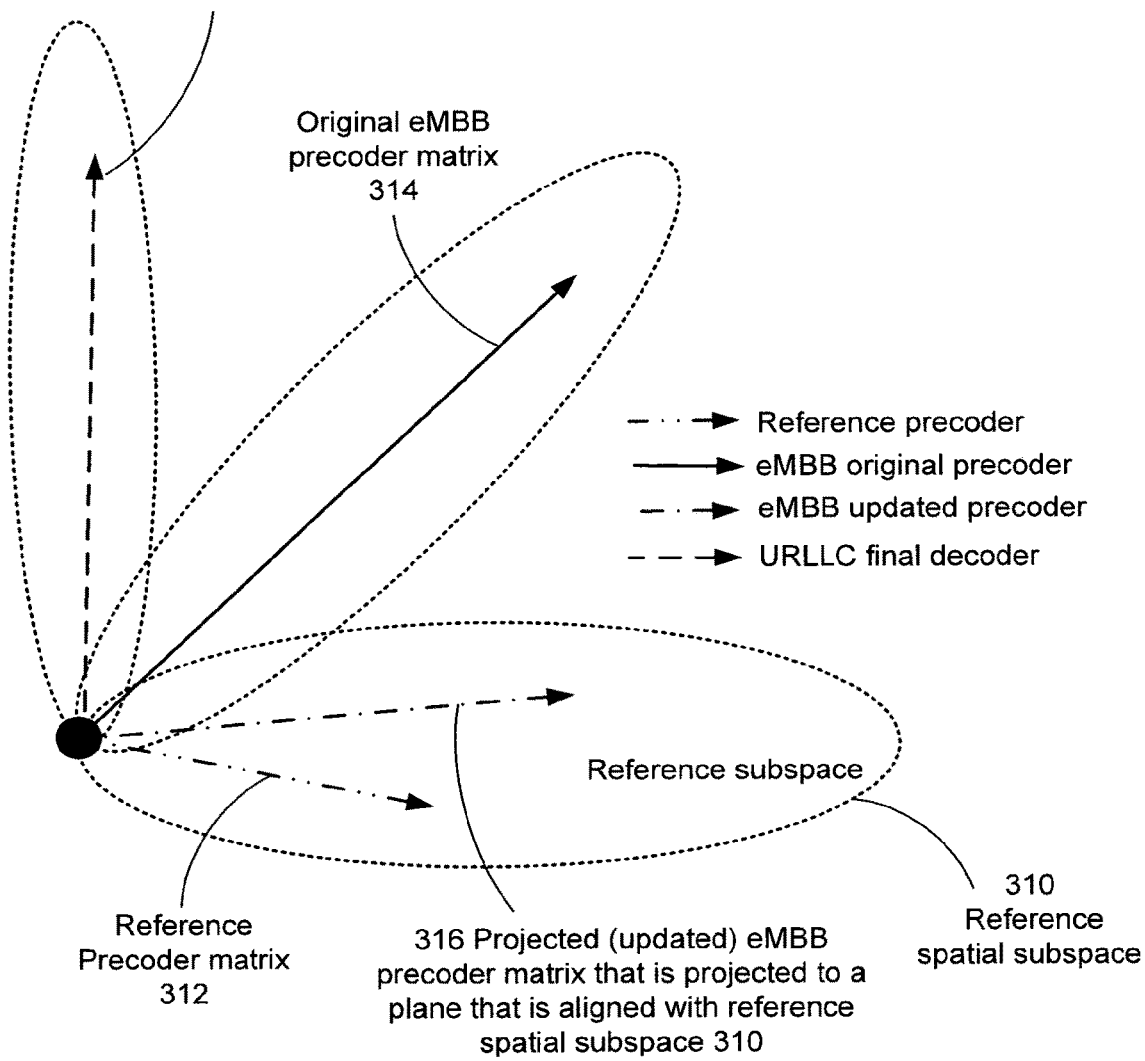
FIG. 3 is a diagram illustrating a reference spatial subspace according to an example embodiment.

FIG. 3 is a diagram illustrating a reference spatial subspace according to an example embodiment. A reference spatial subspace 310, e.g., which may include a reference precoder matrix 312, may include a direction, or a range of directions. The reference spatial subspace 310 may be determined by the BS and one or more UEs (e.g., determined by the eMBB UE and the URLLC UE). For example, the reference spatial subspace 310 may be known in advance by the BS and UEs, or the BS may send control information to the UEs indicating the reference spatial subspace 310. The reference spatial subspace 310 may be used as a reference from which the BS may project (or transfer) a eMBB precoder matrix, and from which a URLLC UE may project (or transfer) its decoder matrix, e.g., so as to reduce interference at the URLLC UE due to the eMBB data block received by the URLLC UE.

According to an example embodiment, the BS may select a eMBB UE, out of a plurality of eMBB UEs, based on a Euclidean distance from a precoder matrix of the eMBB UE to the reference spatial subspace 310. For example, the BS may select a eMBB UE that has a precoder matrix that is nearest to the reference spatial subspace. A (original or initial) eMBB precoder matrix 314 is shown in FIG. 3. The BS may project (or transfer) the (initial or original) eMBB precoder matrix to a target plane that is aligned with the reference spatial subspace 310. Thus, for example, as shown in FIG. 3, the BS may project the eMBB precoder matrix 314 to the projected (updated) eMBB precoder matrix 316 that is aligned with (or to a target plane that is aligned with) the reference spatial subspace 310. The projected (updated) eMBB precoder matrix 316 is shown in FIG. 3 as being in a target plane that is aligned with the reference spatial subspace 310.

Also, according to an example embodiment, the BS may transmit to the URLLC UE (e.g., via downlink control information (DCI) within a physical downlink control channel (PDCCH) a co-scheduling bit (or flag) that indicates that the scheduled resources (PRBs) scheduled for the downlink (DL) transmission of the URLLC data to the URLLC UE are co-scheduled with a transmission of another signal (e.g., a eMBB data block) that is aligned to or projected to a plane that is aligned with the reference spatial subspace (which is known by the URLLC UE). Thus, an alpha bit, or a co-scheduling bit (or flag) indicates to the URLLC UE that an interfering signal will be co-scheduled for transmission on the same PRBs as the URLLC data block for MU-MIMO transmission, and that the interfering signal (e.g., co-scheduled eMBB data block) will be projected (or transferred or located) to a plane that is aligned to the reference spatial subspace 310.

Therefore, in response to receiving the alpha bit, or a co-scheduling bit (or flag) that indicates that an interfering signal will be transmitted on the same PRBs as the URLLC data block (and in a plane aligned with the reference spatial subspace), the URLLC UE projects its (initial or original) decoder matrix to be orthogonal (or substantially orthogonal) to reference spatial subspace 310. The projected (or updated) URLLC decoder matrix 318 is shown in FIG. 3, and is orthogonal to or substantially orthogonal to the reference spatial subspace 310. Thus, for example, by the URLLC UE using a projected (or updated) URLLC decoder matrix 318 that is orthogonal (or at least substantially orthogonal) to the reference spatial subspace 310 (e.g., and thus orthogonal to or substantially orthogonal to the projected eMBB precoder matrix 316), this allows the URLLC UE to receive the URLLC data block, which was co-scheduled with the eMBB data block, while reducing interference from the co-scheduled eMBB data block (e.g., based on the orthogonality, or substantial orthogonality, of these two data blocks that were co-scheduled for MU-MIMO transmission).

By way of illustrative example, substantially orthogonal may have different definitions or interpretations, depending on the case or application, as required. For example, in a first example, substantially orthogonal may mean that the URLLC decoder matrix 318 is at least 80% orthogonal to the reference spatial subspace 310. In a second example, substantially orthogonal may mean that the URLLC decoder matrix 318 is at least 90% orthogonal to the reference spatial subspace 310. In a third example, substantially orthogonal may mean that the URLLC decoder matrix 318 is at least 95% orthogonal to the reference spatial subspace 310. In a fourth example, substantially orthogonal may mean that the URLLC decoder matrix 318 is at least 99% orthogonal to the reference spatial subspace 310. Other examples may be used as well.

In this manner, techniques are described wherein a BS scheduler may co-schedule both a eMBB data block and a URLLC data block for MU-MIMO transmission. The BS may project the eMBB precoder matrix to a target plane that is aligned with a (known) reference spatial subspace, and the URLLC UE may project its decoder matrix to be orthogonal or substantially orthogonal with the reference spatial subspace, e.g., in order to provide low latency URLLC transmission and continuing eMBB transmission, while reducing interference from the eMBB transmission at the URLLC UE. In summary, the example embodiments provide techniques to efficiently co-schedule short-TTI URLLC transmissions and longer-TTI eMBB transmissions in a semi-controlled multi-user MIMO (MU-MIMO), for the sake of the URLLC performance and with minimal impact on the eMBB performance at the same time.

According to an example embodiment, a method or technique is provided for co-scheduling transmission of both a mobile broadband (e.g., eMBB) data block and an ultra low latency (e.g., URLLC) data block using multi-user multiple-input, multiple-output (MU-MIMO). The method may include determining, by a BS, a reference spatial subspace that indicates a direction; selecting, by the BS, a first UE (e.g., a first eMBB UE), out of a plurality of mobile broadband (e.g., eMBB) UEs, to receive the mobile broadband (e.g., eMBB) data block, based on a Euclidean distance from a precoder matrix for the first UE to the reference spatial subspace (e.g., a eMBB UE may be selected that has a precoder matrix that is nearest to a reference spatial subspace 310); projecting, by the BS, the precoder matrix for the first UE (selected eMBB UE) to a target plane that is aligned with the reference spatial subspace 310; co-scheduling transmission of both a mobile broadband (e.g., eMBB) data block to the first UE (e.g., to the selected eMBB UE) and an ultra low latency (e.g., URLLC) data block to a second UE (e.g., a URLLC UE) via a set of one or more physical resource blocks (PRBs) using multi-user multiple-input, multiple-output (MU-MIMO); and transmitting, by the BS to the second UE (e.g., the URLLC UE), control information (e.g., an alpha bit, or a co-scheduling indication bit or flag) indicating that the scheduled transmission (or resources/PRBs allocated for such transmission) of the ultra low latency (e.g., URLLC) data block to the second UE (e.g., URLLC UE) is co-scheduled with a transmission of the mobile broadband (e.g., eMBB) data block via a set of shared physical resource blocks (e.g., a set of PRBs that are shared by the transmission of both the eMBB data block and the URLLC data block).

According to another example embodiment, a method or technique may include determining, by an ultra low latency UE (e.g., a URLLC UE), a reference spatial subspace 310; determining, by the ultra low latency UE, a (e.g., initial) decoder matrix (e.g., where the URLLC UE may receive reference signals from the BS, estimate a DL channel between the BS and URLLC UE, and then determine an initial decoder matrix based on the channel estimate); receiving, by the ultra low latency UE (e.g., URLLC UE), control information (e.g., an alpha bit, or a co-scheduling indication bit or flag) indicating that a scheduled transmission of an ultra low latency (e.g., URLLC) data block to the ultra low latency UE (e.g., URLLC UE) is co-scheduled with a transmission of a mobile broadband (e.g., eMBB) data block to a mobile broadband UE (e.g., eMBB UE) via a set of shared physical resource blocks using multi-user multiple-input, multiple-output (MU-MIMO); and projecting, by the ultra low latency UE (e.g., URLLC UE), the decoder matrix of the ultra low latency UE to be (at least) substantially orthogonal with the reference spatial subspace 310 in which a precoder matrix for the mobile broadband UE is aligned with the reference spatial subspace 310, to reduce interference at the ultra low latency UE caused by the transmission of the enhanced mobile broadband (e.g., eMBB) data block, when receiving the ultra low latency (e.g., URLLC) data block (e.g., when the URLLC UE is receiving or attempting to receive the URLLC data block using or based on the projected decoder matrix 316).

Thus, for example, an alpha bit, or the co-scheduling indication bit or flag may inform the URLLC UE that an interfering signal (e.g., eMBB data block) will be (or is) co-scheduled with the URLLC transmission/data block, and that the interfering (e.g., eMBB) transmission or data block that is co-scheduled with the URLLC transmission, is aligned with the reference spatial subspace or projected to a plane that is aligned to the reference spatial subspace. Thus, to avoid or at least decrease interference at the URLLC UE due to the co-scheduled eMBB (interfering) transmission or data block, the URLLC UE may project its decoder matrix to be orthogonal, or at least substantially orthogonal, to the reference spatial subspace 310.

Further illustrative example embodiments and details will be briefly described.

Various example embodiment may be directed to a MAC scheduling method to schedule the sporadically incoming URLLC traffic (e.g., without queuing/buffering) in order to robustly satisfy its latency budget, while simultaneously maximizing (or at least improving) both the eMBB and cell overall performance. The URLLC traffic, arriving at the BS with a short TTI periodicity, may be given a higher priority from the time domain (TD) scheduler, to be assigned single-user (SU) dedicated resources first.

If the radio resources are not available at this time or available resources are not sufficient for transmitting the entire URLLC payload message, the MAC scheduler immediately enforces fitting the URLLC traffic in a controlled multi-user MIMO (MU-MIMO) transmission for the sake of the URLLC performance, thus, the URLLC user is instantly paired to an eMBB ongoing transmission. A pre-defined and pre-known spatial subspace is defined and the MAC scheduler instantly picks the eMBB user whose precoder vector is the closest possible to this reference subspace, for pairing with the URLLC user. Then, it projects the eMBB precoder onto the reference subspace in order for its paired URLLC user to orient its decoder matrix into the null space of this reference subspace. Hence, no inter-user interference is experienced at the URLLC user side, which results in enhancing its received SINR point and thus, a reduced probability of retransmissions. The associated eMBB transmission incurs a decoding loss due to its precoder projection, however, loss is efficiently minimized by the applied measures on top, as will be described below.

An example embodiment may include, for example:

1) The (e.g., instant) projection of the eMBB UE/user precoder onto a pre-defined discrete Fourier transform (DFT) spatial subspace over victim physical resource blocks (PRBs).

2) The BS immediately signals the paired URLLC user with a single-bit Boolean index $\alpha$ (either $\alpha=0$ or 1) in the downlink control information (DCI) or within the in-resource control channel ahead of its data allocation. At the URLLC user side, if $\alpha=1$, it performs step 3. The alpha bit, or co-scheduling indication bit, may indicate that the scheduled resources are co-scheduled with another DL signal which will be aligned with the reference spatial subspace.

3) At the URLLC UE side, URLLC UE projects (or de-orients) its decoder matrix, designed by its receiver, into one possible null space of the reference spatial subspace 310 (e.g., projects its decoder matrix to a plane that is orthogonal to the reference spatial subspace), where the inter-user interference (e.g., co-scheduled eMBB transmission) is aligned. Thus, the URLLC decoder matrix may experience relatively low (e.g., near zero in some cases) interference from the MU-MIMO transmission, based on the projecting of the URLLC decoder matrix to be orthogonal or substantially orthogonal with the reference spatial subspace.

Figure 4:
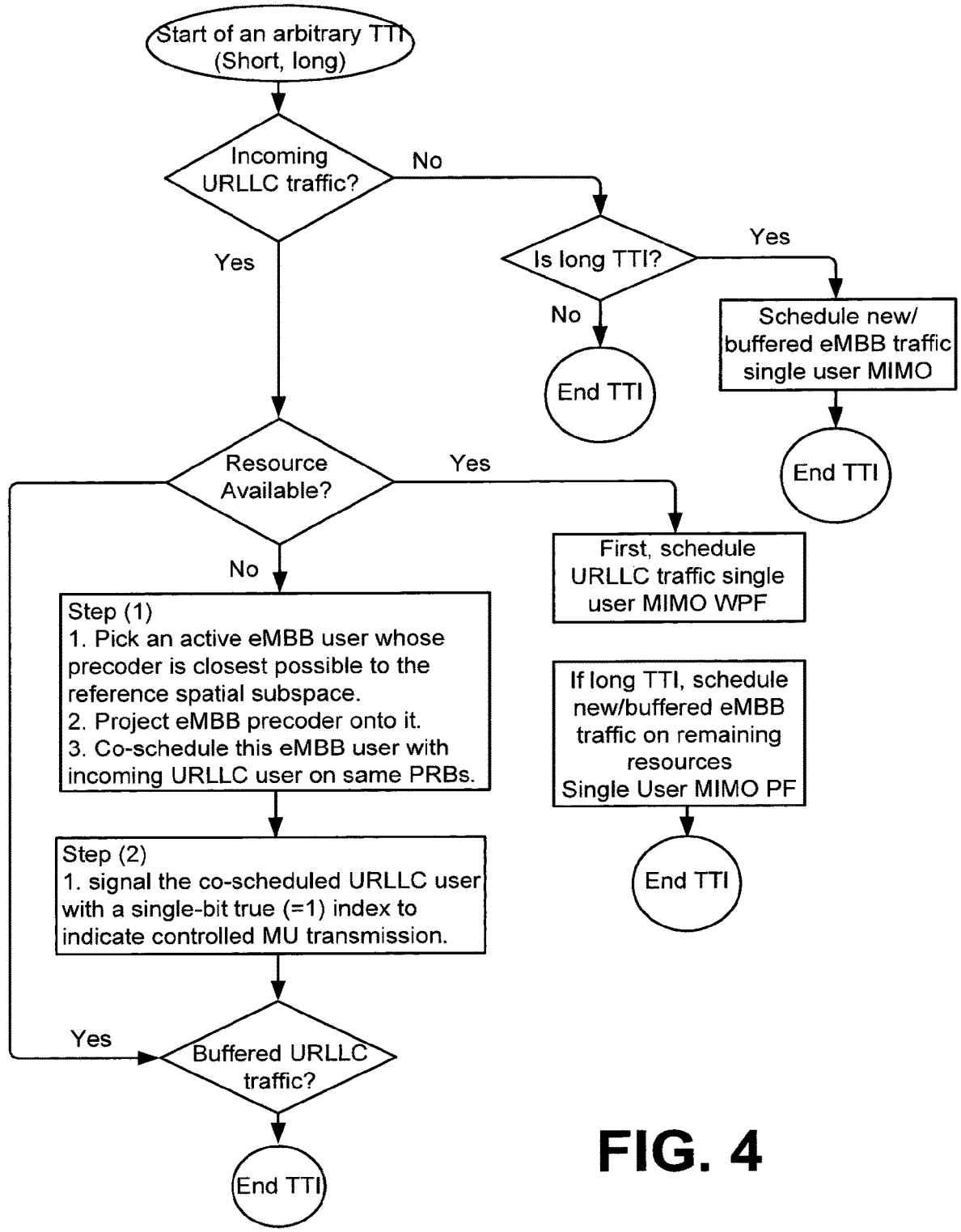
FIG. 4 is a flow chart illustrating operation of a scheduler at a base station according to an example embodiment.
Figure 5:
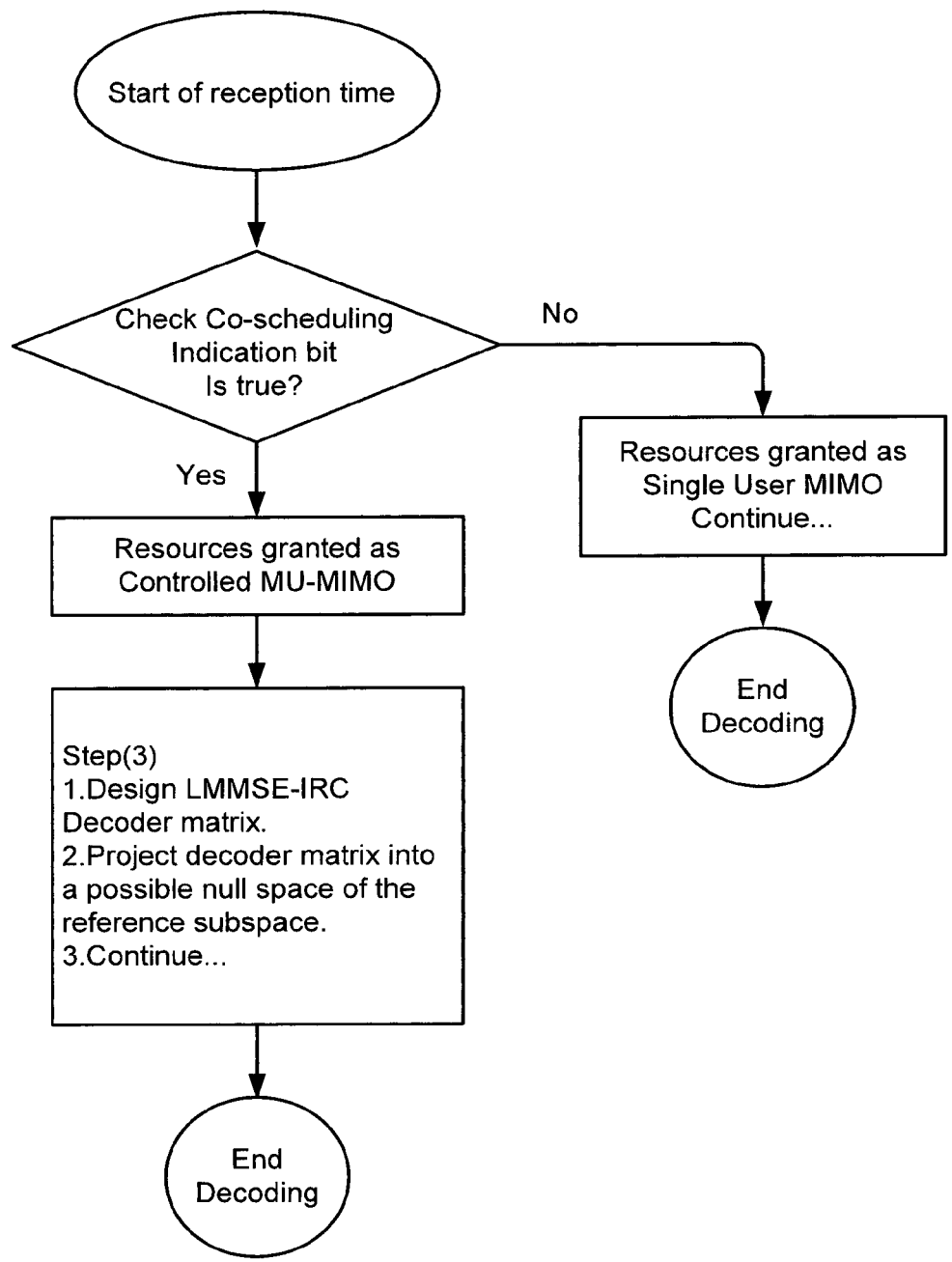
FIG. 5 is a flow chart illustrating operation of a URLLC user device/UE according to an example embodiment.

FIG. 4 is a flow chart illustrating operation of a scheduler at a base station according to an example embodiment. FIG. 5 is a flow chart illustrating operation of a URLLC user device/UE according to an example embodiment.

At the BS side: (FIG. 4)

At an arbitrary MAC scheduling opportunity, if there is no offered URLLC traffic:

The scheduler continues the ongoing URLLC/eMBB transmissions, if it is a short TTI event.

The scheduler schedules new and/or buffered eMBB traffic using SU-MIMO, based on the proportional fair (PS) criteria in both time and frequency domains (TD and FD), if it is a long TTI event.

If there is incoming URLLC traffic and sufficient radio resources are available:

Either it is a short TTI or a long TTI event, TD (time domain) scheduler always assigns the URLLC traffic a higher scheduling priority for immediate scheduling without buffering, based on the weighted PF (WPF) metric. Thus, URLLC traffic is scheduled first with SU-MIMO.

If it is also aligned with a long TTI event, BS MAC scheduler is allowed to schedule part of the new/buffered eMBB traffic on the remaining resources with SU-MIMO PF.

Step 1): If there is incoming URLLC traffic and NO radio resources are available: then, the BS scheduler pre-defines an arbitrary DFT (discrete Fourier Transform) subspace (reference spatial subspace), pointing at an arbitrary direction as:

$$V_{ref}(\theta) = \left(\frac{1}{\sqrt{N_t}}\right)[1, e^{-j2\pi\Delta \cos\theta}, \ldots, e^{-j2\pi\Delta(N_t-1)\cos\theta}]^T$$

where $V_{ref}(\theta)$ is the reference subspace in the $\theta$ direction, and $(.)^T$ denotes the transpose operation. Then, the scheduler searches for an active (i.e., transmitting) eMBB user whose reported precoding matrix is the closest possible to the reference spatial subspace using the minimum Euclidean distance as:

$$k^*_{eMBB} = \arg\min_{\kappa_{eMBB}} d(V_e, V_{ref})$$

$$d(V_e, V_{ref}) = \frac{1}{\sqrt{2}}\|V_e V_e^H - V_{ref} V_{ref}^H\|$$

where $k^*_{emBB} \mathcal{K}_{eMBB}$ denote the selected eMBB user which satisfies the minimum distance and the whole set of the active eMBB users, respectively. $V_e$ is the eMBB user precoder matrix and $(.)^H$ denotes the Hermitian transpose operation, $\|.\|$ indicates the 2-norm operation.

Later, the scheduler projects on-the-fly the selected eMBB precoder matrix onto the reference spatial subspace to pre-align its inter-user interference (pre-align such interference to the reference spatial sub-space), impacting the co-scheduled URLLC user/UE, within this reference spatial subspace, and over the victim PRBs as:

$$V_e^{aligned} = \frac{V_e \cdot V_{ref}}{\|V_{ref}\|^2} \times V_{ref}$$

where $V_e$ is the updated eMBB precoder matrix, and (X . Y) indicates the dot product of X and Y. Thereafter, scheduler immediately allocates the incoming URLLC user/UE with part of/all the same PRB allocation of this eMBB user (e.g., performs or schedules MU-MIMO transmission between this URLLC-eMBB user pair). In this way, the eMBB interfering signal is contained within the reference spatial subspace and with a minimal loss (because of the update or projection of the URLLC precoder matrix) due to the minimum distance condition (e.g., due to selecting the eMBB having a precoder matrix that is nearest or closest to the reference spatial subspace).

Additional Note: one further recovery mechanism for the eMBB performance can be also applied on top of the MU pairing (co-scheduling) such as to skip the eMBB precoder matrix projection if both eMBB UE and URLLC UE have originally shown sufficient precoder spatial separation, thus, the inter-user interference is originally limited.

Step 2: The BS signals the paired URLLC user with $\alpha=1$, indicating that granted PRBs in the downlink are shared (co-scheduled) with an active eMBB UE/user whose signal is contained on the pre-known reference spatial subspace. This signaling could be sent in the downlink control information (DCI) on the PDCCH, or by means of other signaling methods from the BS to the URLLC UE/user.

If there is further URLLC traffic to get scheduled, the BS MAC scheduler repeats the above steps again.

At the URLLC user side: (FIG. 4)

Using a standard linear minimum mean square error interference rejection combining (LMMSE-IRC) receiver, the URLLC UE designs its conventional decoding matrix such that its received SINR (signal to interference plus noise ratio) is maximized, e.g., inter-cell interference level is minimized.

Step 3: If $\alpha=1$, the URLLC user realizes that its allocated or granted PRBs for the DL URLLC data transmission are being shared (co-scheduled) with an eMBB UE/user (an interfering signal), whose interfering precoder matrix, and hence, the interference effective channel, are both aligned within the reference spatial subspace. Thus, the URLLC UE updates its decoder matrix to fit it within one possible null space of the reference spatial subspace (causing the URLLC decoder matrix to be orthogonal to or at least substantially orthogonal to the reference spatial subspace) as:

$$U_{u,1} = (H_u H_u^H + W)^{-1} H_u$$

$$W = E(H_u H_u^H) + \sigma^2 I_{M_r}$$

$$U_{u,2} = U_{u,1} - \frac{(U_{u,1} \cdot H_u V_{ref})}{\|H_u V_{ref}\|^2} \times H_u V_{ref}$$

where $U_{u,1}$ and $U_{u,2}$ are the original LMMSE-IRC and second updated decoder matrices of the URLLC UE/user, respectively. $H_u$ and $H_u V_{ref}$ are the estimated direct channel and the inter-user interference effective channel of the URLLC UE/user, respectively. Hence, the final decoding matrix $U_{u,2}$ experiences as minimum inter-user interference as possible.

Example Advantages

Some example or illustrative advantages may include, for example, one or more of:

Provides a low latency URLLC transmission performance, while supporting eMBB data transmission (based on co-scheduling using MU-MIMO), while decreasing the co-scheduled eMBB interference viewed by URLLC UE;

Provides robust URLLC latency performance (e.g., at all times), regardless of the network loading conditions, users' original spatial separation, user geolocations, etc.;

Provides an improved cell SE (spectral efficiency) due to the achievable MU transmission gain;

Offers additional background load; however, with controlled resultant interference, to the URLLC transmissions, which contributes to stabilize the link adaptation (LA) of the URLLC traffic, e.g., reduces the variation rate of the interference pattern in the user reported channel quality indicator (CQI); and/or Downlink signaling overhead is limited, e.g., by use of a single Boolean bit (e.g., alpha bit), without the need for signaling cross-precoder information, and interfering symbol constellation, which may increase overhead size.

Some example embodiments are now described.

Figure 6:
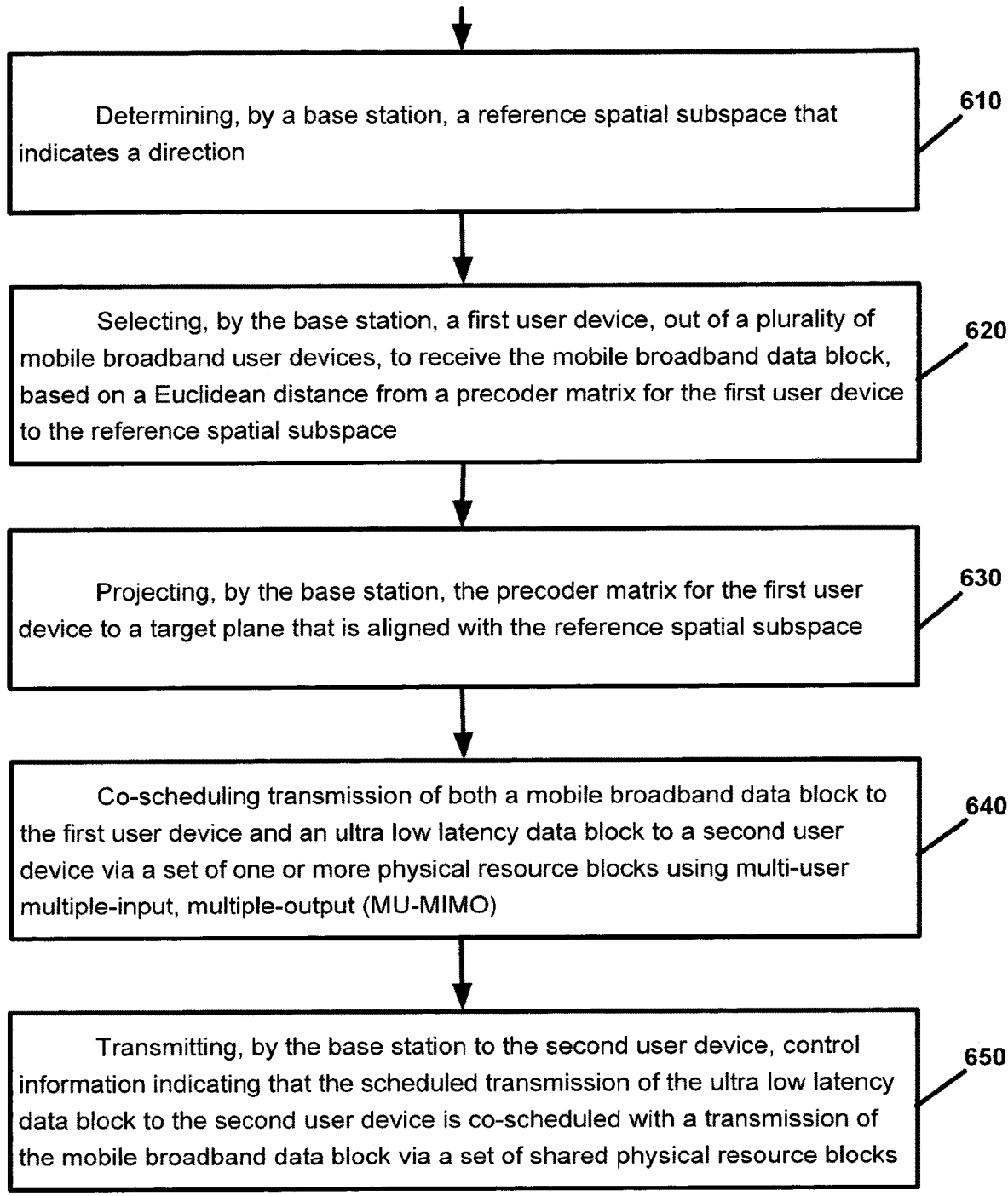
FIG. 6 is a flow chart illustrating operation of a base station (BS) scheduler according to an example implementation.

Example 1. FIG. 6 is a flow chart illustrating operation of a base station according to an example embodiment. FIG. 6 may illustrate a method of co-scheduling transmission of both a mobile broadband data block and an ultra low latency data block using multi-user multiple-input, multiple-output (MU-MIMO). Operation 610 includes determining, by a base station, a reference spatial subspace that indicates a direction. Operation 620 includes selecting, by the base station, a first user device, out of a plurality of mobile broadband user devices, to receive the mobile broadband data block, based on a Euclidean distance from a precoder matrix for the first user device to the reference spatial subspace. Operation 630 includes projecting, by the base station, the precoder matrix for the first user device to a target plane that is aligned with the reference spatial subspace. Operation 640 includes co-scheduling transmission of both a mobile broadband data block to the first user device and an ultra low latency data block to a second user device via a set of one or more physical resource blocks using multi-user multiple-input, multiple-output (MU-MIMO). And, operation 650 includes transmitting, by the base station to the second user device, control information indicating that the scheduled transmission of the ultra low latency data block to the second user device is co-scheduled with a transmission of the mobile broadband data block via a set of shared physical resource blocks.

Example 2. According to an example embodiment of the method of example 1, and further comprising: transmitting, by the base station, both the mobile broadband data block to the first user device and the ultra low latency data block to the second user device via the set of shared physical resource blocks using multi-user multiple-input, multiple-output (MU-MIMO).

Example 3. According to an example embodiment of the method of any of examples 1-2, wherein the projecting comprises: transferring the precoder matrix for the first user device from a first plane that is not aligned with the reference spatial subspace to the target plane that is aligned with the reference spatial subspace.

Example 4. According to an example embodiment of the method of any of examples 1-3, wherein the co-scheduling transmission comprises: co-scheduling transmission, via a shared set of one or more physical resource blocks using multi-user multiple-input, multiple-output (MU-MIMO), of both a mobile broadband data block to the first user device via at least one short transmission time intervals and an ultra low latency data block to a second user device via a long transmission time interval that is longer than the short transmission time interval.

Example 5. According to an example embodiment of the method of any of examples 1-4, wherein: the first user device is an enhanced mobile broadband (eMBB) user device, or a user device with a eMBB application running thereon; and the second user device is a Ultra-Reliable and Low Latency Communications (URLLC) user device, or a user device with a URLLC application running thereon.

Example 6. According to an example embodiment of the method of any of examples 1-5, wherein the selecting comprises: selecting, by the base station, a first user device, out of a plurality of mobile broadband user devices, based on a precoder matrix for the first user device that is nearest to the reference spatial subspace, as compared to other mobile broadband user devices.

Example 7. According to an example embodiment of the method of any of examples 1-6, wherein the control information is transmitted within downlink control information (DCI) via a physical downlink control channel (PDCCH).

Example 8. An apparatus comprising at least one processor and at least one memory including computer instructions, when executed by the at least one processor, cause the apparatus to co-schedule transmission of both a mobile broadband data block and an ultra low latency data block using multi-user multiple-input, multiple-output (MU-MIMO), including causing the apparatus to: determine, by a base station, a reference spatial subspace that indicates a direction; select, by the base station, a first user device, out of a plurality of mobile broadband user devices, to receive the mobile broadband data block, based on a Euclidean distance from a precoder matrix for the first user device to the reference spatial subspace; project, by the base station, the precoder matrix for the first user device to a target plane that is aligned with the reference spatial subspace; co-schedule transmission of both a mobile broadband data block to the first user device and an ultra low latency data block to a second user device via a set of one or more physical resource blocks using multi-user multiple-input, multiple-output (MU-MIMO); and transmit, by the base station to the second user device, control information indicating that the scheduled transmission of the ultra low latency data block to the second user device is co-scheduled with a transmission of the mobile broadband data block via a set of shared physical resource blocks.

Example 9. The apparatus of example 8 and further causing the apparatus to: transmit, by the base station, both the mobile broadband data block to the first user device and the ultra low latency data block to the second user device via the set of shared physical resource blocks using multi-user multiple-input, multiple-output (MU-MIMO).

Example 10. The apparatus of any of examples 8-9, wherein causing the apparatus to project comprises causing the apparatus to: project the precoder matrix for the first user device from a first plane that is not aligned with the reference spatial subspace to the target plane that is aligned with the reference spatial subspace.

Example 11. The apparatus of any of examples 8-10 wherein causing the apparatus to the co-scheduling transmission comprises causing the apparatus to: co-schedule transmission, via a shared set of one or more physical resource blocks using multi-user multiple-input, multiple-output (MU-MIMO), of both a mobile broadband data block to the first user device via at least one short transmission time intervals and an ultra low latency data block to a second user device via a long transmission time interval that is longer than the short transmission time interval.

Example 12. The apparatus of any of examples 8-11, wherein: the first user device is an enhanced mobile broadband (eMBB) user device, or a user device with a eMBB application running thereon; and the second user device is a Ultra-Reliable and Low Latency Communications (URLLC) user device, or a user device with a URLLC application running thereon.

Example 13. The apparatus of any of examples 8-12 wherein causing the apparatus to select comprises causing the apparatus to: select, by the base station, a first user device, out of a plurality of mobile broadband user devices, based on a precoder matrix for the first user device that is nearest to the reference spatial subspace, as compared to other mobile broadband user devices.

Example 14. The apparatus of any of examples 8-13 wherein the control information is transmitted within downlink control information (DCI) via a physical downlink control channel (PDCCH).

Figure 7:
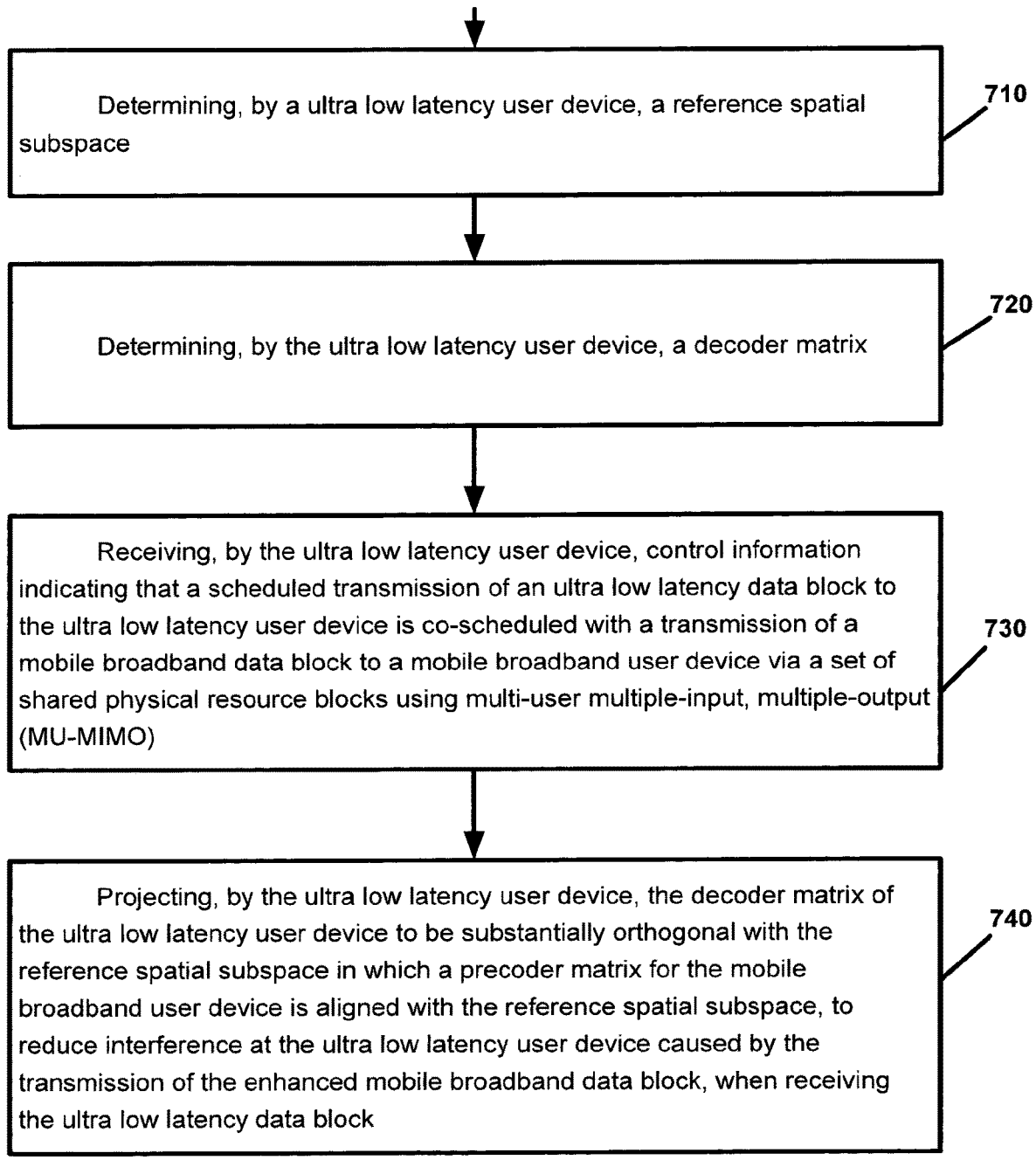
FIG. 7 is a flow chart illustrating operation of a user device (UE) or data receiver according to an example implementation.

Example 15. FIG. 7 is a flow chart illustrating operation of a user device (UE) or data receiver according to an example implementation. Operation 710 includes determining, by a ultra low latency user device, a reference spatial subspace. Operation 720 includes determining, by the ultra low latency user device, a decoder matrix. Operation 730 includes receiving, by the ultra low latency user device, control information indicating that a scheduled transmission of an ultra low latency data block to the ultra low latency user device is co-scheduled with a transmission of a mobile broadband data block to a mobile broadband user device via a set of shared physical resource blocks using multi-user multiple-input, multiple-output (MU-MIMO). Operation 740 includes projecting, by the ultra low latency user device, the decoder matrix of the ultra low latency user device to be substantially orthogonal with the reference spatial subspace in which a precoder matrix for the mobile broadband user device is aligned with the reference spatial subspace, to reduce interference at the ultra low latency user device caused by the transmission of the enhanced mobile broadband data block, when receiving the ultra low latency data block.

Example 16. According to an example embodiment of the method of example 15, and further comprising: receiving, by the ultra low latency user device, the ultra low latency data block via the set of shared physical resource blocks based on the projected decoder matrix of the ultra low latency user device.

Example 17. According to an example embodiment of the method of any of examples 15-16 wherein the projecting comprises: projecting, by the ultra low latency user device, the decoder matrix of the ultra low latency user device to be orthogonal to the reference spatial subspace in order to reduce interference at the ultra low latency user device caused by the transmission of the enhanced mobile broadband data block, when receiving the ultra low latency data block.

Example 18. According to an example embodiment of the method of any of examples 15-17 wherein the control information is received within downlink control information (DCI) via a physical downlink control channel (PDCCH).

Example 19. An apparatus comprising at least one processor and at least one memory including computer instructions, when executed by the at least one processor, cause the apparatus to: determine, by a ultra low latency user device, a reference spatial subspace; determine, by the ultra low latency user device, a decoder matrix; receive, by the ultra low latency user device, control information indicating that a scheduled transmission of an ultra low latency data block to the ultra low latency user device is co-scheduled with a transmission of a mobile broadband data block to a mobile broadband user device via a set of shared physical resource blocks using multi-user multiple-input, multiple-output (MU-MIMO); and project, by the ultra low latency user device, the decoder matrix of the ultra low latency user device to be substantially orthogonal with the reference spatial subspace in which a precoder matrix for the mobile broadband user device is aligned with the reference spatial subspace, to reduce interference at the ultra low latency user device caused by the transmission of the enhanced mobile broadband data block, when receiving the ultra low latency data block.

Example 20. The apparatus of example 19 and further causing the apparatus to: receive, by the ultra low latency user device, the ultra low latency data block via the set of shared physical resource blocks based on the projected decoder matrix of the ultra low latency user device.

Example 21. The apparatus of any of examples 19-20 wherein causing the apparatus to project comprises causing the apparatus to: project, by the ultra low latency user device, the decoder matrix of the ultra low latency user device to be orthogonal to the reference spatial subspace in order to reduce interference at the ultra low latency user device caused by the transmission of the enhanced mobile broadband data block, when receiving the ultra low latency data block.

Example 22. The apparatus of any of examples 19-21 wherein the control information is received within downlink control information (DCI) via a physical downlink control channel (PDCCH).

Example 23. An apparatus comprising means for performing a method of any of examples 1-7 and 15-18.

Example 24. A computer program product for a computer, comprising software code portions for performing the steps of any of examples 1-7 and 15-18 when said product is run on the computer.

Example 25. An apparatus comprising at least one processor and at least one memory including computer instructions, when executed by the at least one processor, cause the apparatus to perform a method of any of examples 1-7 and 15-18.

Figure 8:
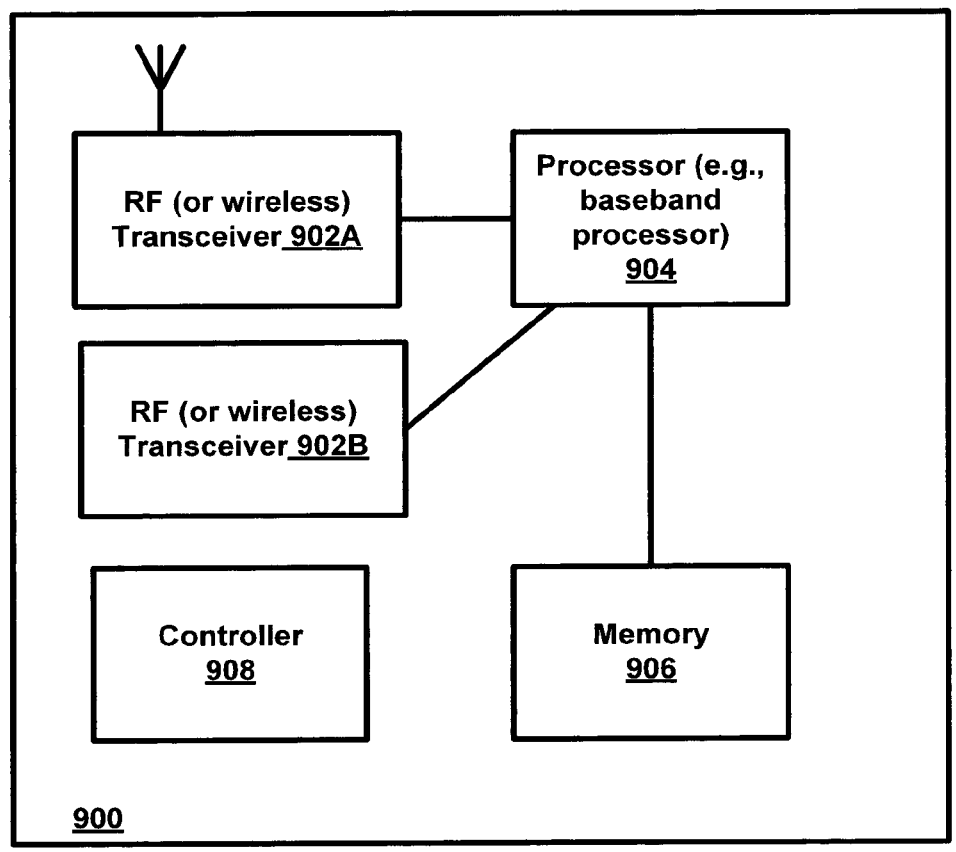
FIG. 8 is a block diagram of a node or wireless station (e.g., base station/access point or mobile station/user device/UE) according to an example implementation.

FIG. 8 is a block diagram of a wireless station (e.g., AP or user device) 900 according to an example implementation. The wireless station 900 may include, for example, one or two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 8, a controller (or processor) 908 may execute software and instructions, and may provide overall control for the station 900, and may provide control for other systems not shown in FIG. 8, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    determining, by an ultra low latency user device, a reference spatial subspace;
    determining, by the ultra low latency user device, a decoder matrix;
    receiving, by the ultra low latency user device, a single bit control information indicating that a scheduled transmission of an ultra low latency data block to the ultra low latency user device is co-scheduled with a transmission of a mobile broadband data block to a mobile broadband user device via a set of shared physical resource blocks using multi-user multiple-input, multiple-output (MU-MIMO); and
    projecting, by the ultra low latency user device, the decoder matrix of the ultra low latency user device to be substantially orthogonal with the reference spatial subspace in which a precoder matrix for the mobile broadband user device is aligned with the reference spatial subspace, to reduce interference at the ultra low latency user device caused by the transmission of an enhanced mobile broadband data block, when receiving the ultra low latency data block.

2. The method of claim 1, further comprising:
    receiving, by the ultra low latency user device, the ultra low latency data block via the set of shared physical resource blocks based on the projected decoder matrix of the ultra low latency user device.

3. The method of claim 1, wherein the projecting comprises:
    projecting, by the ultra low latency user device, the decoder matrix of the ultra low latency user device to be orthogonal to the reference spatial subspace in order to reduce interference at the ultra low latency user device caused by the transmission of the enhanced mobile broadband data block, when receiving the ultra low latency data block.

4. The method of claim 1, wherein the control information is received within downlink control information (DCI) via a physical downlink control channel (PDCCH).

5. An apparatus comprising at least one processor and at least one memory including computer instructions, when executed by the at least one processor, cause the apparatus to:
    determine, by an ultra low latency user device, a reference spatial subspace;
    determine, by the ultra low latency user device, a decoder matrix;
    receive, by the ultra low latency user device, a single bit control information indicating that a scheduled transmission of an ultra low latency data block to the ultra low latency user device is co-scheduled with a transmission of a mobile broadband data block to a mobile broadband user device via a set of shared physical resource blocks using multi-user multiple-input, multiple-output (MU-MIMO); and
    project, by the ultra low latency user device, the decoder matrix of the ultra low latency user device to be substantially orthogonal with the reference spatial subspace in which a precoder matrix for the mobile broadband user device is aligned with the reference spatial subspace, to reduce interference at the ultra low latency user device caused by the transmission of an enhanced mobile broadband data block, when receiving the ultra low latency data block.

6. The apparatus of claim 5, wherein the at least one processor and the at least one memory further causes the apparatus to:
    receive, by the ultra low latency user device, the ultra low latency data block via the set of shared physical resource blocks based on the projected decoder matrix of the ultra low latency user device.

7. The apparatus of claim 5, wherein the at least one processor and the at least one memory further causes the apparatus to:
    project, by the ultra low latency user device, the decoder matrix of the ultra low latency user device to be orthogonal to the reference spatial subspace in order to reduce interference at the ultra low latency user device caused by the transmission of the enhanced mobile broadband data block, when receiving the ultra low latency data block.

8. The apparatus of claim 5, wherein the control information is received within downlink control information (DCI) via a physical downlink control channel (PDCCH).

9. A non-transitory computer-readable storage medium comprising instructions stored thereon that, when executed by at least one processor, are configured to cause a computing system to:
    determine a reference spatial subspace;
    determine a decoder matrix;
    receive a single bit control information indicating that a scheduled transmission of an ultra low latency data block to an ultra low latency user device is co-scheduled with a transmission of a mobile broadband data block to a mobile broadband user device via a set of shared physical resource blocks using multi-user multiple-input, multiple-output (MU-MIMO); and project the decoder matrix of the ultra low latency user device to be substantially orthogonal with the reference spatial subspace in which a precoder matrix for the mobile broadband user device is aligned with the reference spatial subspace, to reduce interference at the ultra low latency user device caused by the transmission of an enhanced mobile broadband data block, when receiving the ultra low latency data block.

10. The non-transitory computer-readable storage medium of claim 9, wherein the instructions are further configured to cause a computing system to:

receive the ultra low latency data block via the set of shared physical resource blocks based on the projected decoder matrix of the ultra low latency user device.

11. The non-transitory computer-readable storage medium of claim 9, wherein the projecting of the decoder matrix comprises:

projecting the decoder matrix of the ultra low latency user device to be orthogonal to the reference spatial subspace in order to reduce interference at the ultra low latency user device caused by the transmission of the enhanced mobile broadband data block, when receiving the ultra low latency data block.

12. The non-transitory computer-readable storage medium of claim 9, wherein the control information is received within downlink control information (DCI) via a physical downlink control channel (PDCCH).

13. The non-transitory computer-readable storage medium of claim 9, wherein the non-transitory computer-readable storage medium is included in the ultra low latency user device.

* * * * *